United States Patent
Schroeder

(10) Patent No.: US 7,050,917 B2
(45) Date of Patent: May 23, 2006

(54) METHOD FOR SELECTIVELY RECONFIGURING A SENSOR ACCORDING TO APPLICABLE SENSING REQUIREMENTS AND RECONFIGURABLE SENSOR

(75) Inventor: Thaddeus Schroeder, Rochester Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 22 days.

(21) Appl. No.: 10/396,764

(22) Filed: Mar. 24, 2003

(65) Prior Publication Data

US 2004/0193380 A1   Sep. 30, 2004

(51) Int. Cl.
*G01C 19/00* (2006.01)
*G01C 25/00* (2006.01)
*G01R 35/00* (2006.01)

(52) U.S. Cl. .................. 702/104; 702/107; 702/116
(58) Field of Classification Search ............... 702/104, 702/107, 116, 33, 150; 324/235, 244, 251
See application file for complete search history.

(56) References Cited

U.S. PATENT DOCUMENTS

| | | | |
|---|---|---|---|
| 5,621,669 A * | 4/1997 | Bjornsson | .................... 702/85 |
| 6,100,682 A | 8/2000 | Schroeder | |
| 6,271,662 B1 | 8/2001 | Schroeder | |
| 6,291,989 B1 | 9/2001 | Schroeder | |
| 6,529,114 B1 * | 3/2003 | Bohlinger et al. | ........ 338/32 R |
| 6,643,573 B1 | 11/2003 | Dickinson et al. | |
| 6,690,159 B1 * | 2/2004 | Burreson et al. | ...... 324/207.23 |
| 2002/0008513 A1 | 1/2002 | Hiligsmann et al. | |
| 2003/0218458 A1* | 11/2003 | Seger et al. | ................. 324/303 |
| 2004/0156266 A1* | 8/2004 | McDonald | ................... 367/136 |

OTHER PUBLICATIONS

European Search Report dated Jul. 25, 2005.
Allegro Microsystems, INC., ATS660LSB, *True Zero-Speed, Hall-Effect Adaptive Gear-Tooth* Sensor, Worcester, Massachusetts, Copyright 2002, 16 pages.

* cited by examiner

*Primary Examiner*—Bryan Bui
*Assistant Examiner*—Meagan S Walling
(74) *Attorney, Agent, or Firm*—Michael D. Smith

(57) ABSTRACT

Reconfigurable sensor and method for selectively reconfiguring a sensor are provided. The reconfiguration of the sensor may be performed according to applicable requirements for sensing the position of an object. The method allows providing an array of sensing elements. The method further allows selecting at least one of the sensing elements of the array to supply a sensing element output signal. One or more operational parameters of the one sensing element may be adjusted to meet the applicable sensing requirements.

15 Claims, 2 Drawing Sheets

METHOD FOR SELECTIVELY RECONFIGURING A SENSOR ACCORDING TO APPLICABLE SENSING REQUIREMENTS AND RECONFIGURABLE SENSOR

BACKGROUND OF THE INVENTION

The present invention relates to a sensor and method for sensing precise position of an object, and, more particularly, to techniques and apparatus for selectively reconfiguring a sensor according to any applicable sensing requirements.

Sensors responsive to galvanomagnetic effects, such as Hall or magnetoresistive sensors, are widely used in many applications, including accurate incremental sensing applications, such as sensing the position of an engine crankshaft. For example, accurate engine crank position information may be needed for achieving appropriate ignition timing and state- and federally-mandated detection of engine misfire.

The crank position information may be encoded on a rotating target wheel in the form of teeth and slots. The edges of the teeth may define predetermined crank positions. The sensor is required to detect these edges accurately and repeatably over a range of air gaps and temperatures. Preferably, the output signal of the sensor should indicate a tooth edge passing through the nominal centerline of the sensor, although, a small fixed offset is acceptable. Usually, the specified accuracy is plus or minus 0.5° with respect to the actual edge, which provides a one-degree tolerance band. Quite often, however, fundamentally good sensors with even tighter tolerance bands must be rejected because they do not fall into the specified one-degree tolerance band.

In one basic implementation, a differential sensor may consist of two sensing elements placed some distance apart from each other (e.g., approximately 1–2 mm) with an output signal that comprises the difference of the respective signals from each sensing element. The differential sensor is capable of limiting the error to the plus or minus 0.5° band quite effectively. However, a frequently encountered problem is a shift of this band away from 0°. That is, a shift relative to the actual position of a tooth edge. An example of this shift would be a sensor having its tolerance band shifted from −0.25 degrees to 0.75 degrees in lieu of having a tolerance band from −0.5° to 0.5°. There are multiple causes that may create such a shift. For example, a slight repositioning of the sensor die within a sensor housing during packaging, incremental displacements of the sensing elements during sensor installation, or any combination of the foregoing. In addition, the sensor may have to be located in a location that requires a convoluted geometry and this may lead to a more complex and costly sensor design and manufacturing, which may not be conducive to readily addressing the physical characteristics of the object being sensed, such as spatial separation between tooth edges.

BRIEF SUMMARY OF THE INVENTION

The inventor of the present invention has recognized a method and sensor that allows reconfiguring at least one sensing element of the sensor. The reconfiguring may allow adjusting one or more operational parameters of the selected sensing element to meet any applicable sensing requirements. Moreover, a virtual repositioning of sensing elements, such as may be performed after or during sensor assembly, may be achieved through appropriate processing so that the output signal of the sensor will accurately and consistently indicate a tooth edge location, free of any errors that may otherwise occur due to shifts of the sensing elements or due to the physical characteristics of the object being sensed relative to the sensing elements, or both.

Generally, the present invention fulfills the foregoing needs by providing, in one aspect thereof, a method for selectively reconfiguring a sensor according to applicable requirements for sensing the position of an object. The method allows providing an array of sensing elements. The method further allows selecting at least one of the sensing elements of the array to supply a sensing element output signal. At least one operational parameter of the one sensing element may be adjusted to meet the applicable sensing requirements.

In another aspect thereof, the method allows determining whether the sensor has been configured to meet the applicable sensing requirements. In the event the sensor needs to be reconfigured, a sensor reconfiguring process is executed for selecting at least one of the sensing elements from a sensing array to supply a sensing element output signal. The sensor reconfiguring process may allow adjusting at least one operational parameter of the one sensing element to meet the applicable sensing requirements.

In yet another aspect, the invention provides a reconfigurable sensor. The sensor reconfiguration is selected according to applicable requirements for sensing the position of an object. The sensor may comprise an array of galvanomagnetic sensing elements spaced apart over a sensor die. The sensor further comprises a processor for selecting at least one of the sensing elements to supply a sensing element output signal. The processor may be configured to adjust one or more operational parameters of the selected sensing element. Examples of operational parameters that could be adjusted may include at least one threshold level, a scale factor, and an offset value for the one sensing element.

In still another aspect of the present invention, the method for reconfiguring a sensor allows providing an array of sensing elements. The method further allows selecting at least one of the sensing elements from the array of sensing elements to supply a sensing element output signal, wherein the selecting of one of the sensing elements comprises at least one of the following actions:

a) adjusting at least one operational parameter of the one sensing element; and b) selecting the one sensing element to establish a spatial separation relative to another sensing element from the sensing array, the spatial separation being selected to match physical characteristics of the object being sensed.

The method may further allow combining the output signal from the one sensing element with an output signal from the other sensing element to generate a combined signal indicative of the position of the object.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
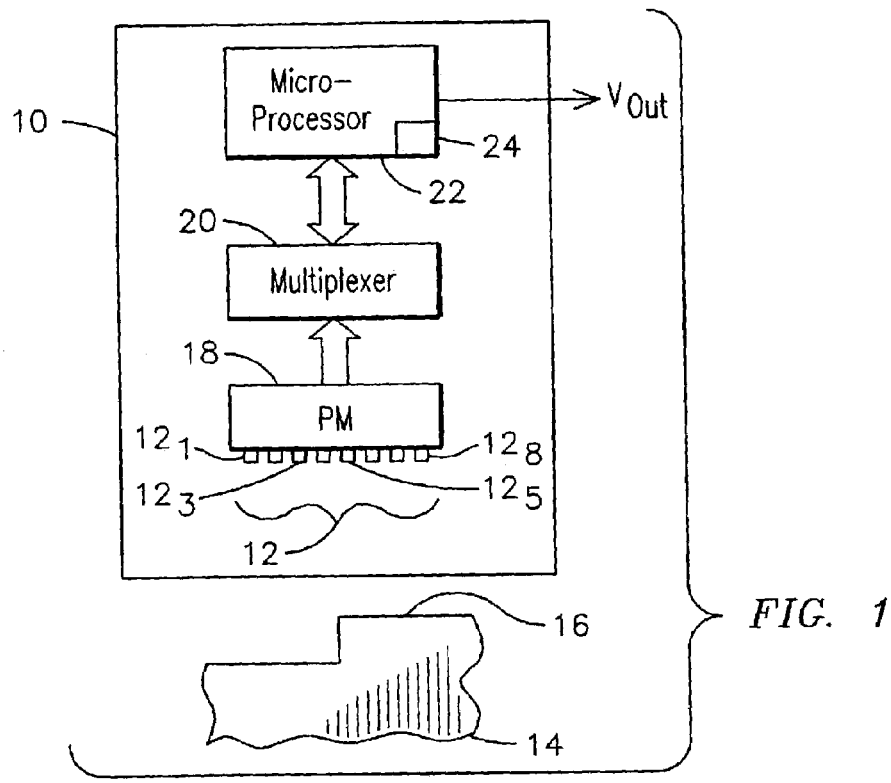
FIG. 1 illustrates a schematic of an exemplary reconfigurable sensor, such as may comprise an array of sensing elements spaced apart over a sensor die for sensing the position of an object.

In one exemplary embodiment, a sensor 10, such as a galvanomagnetic sensor, comprising an array of sensing elements 12 spaced apart over a sensor die may be used to determine the position of an object, such as engine crankshaft angular position. It will be understood that other object state information that may be sensed with sensor 10, or may be extracted through suitable processing of the position information, may include speed, acceleration, or both. In the exemplary embodiment of FIG. 1, the sensor comprises eight sensing elements ($12_1$–$12_8$). It will be understood, however, that the present invention is not limited to any specific number of sensing elements. A wheel 14 of the crankshaft has teeth 16 spaced around its circumference that project toward the sensor. As the crankshaft rotates, each tooth would pass proximate to a sensing element and the magnitude of the voltage signal from the sensing element would increase. The magnitude of the voltage signal would decrease as the tooth moves away from the sensing element. The changes in the voltage signal can be used to determine the speed or angular position of the crankshaft. As will readily be understood by those skilled in the art, each of the sensing elements may be coupled to a biasing magnetic field, such as may be created by a permanent magnet 18.

Several types of galvanomagnetic sensors may be used to detect changes in a magnetic field. One such device is called a Hall effect sensor; another is called a magnetoresistive sensor. The theory of operation of such devices is well understood in the art, and the reader will not be burdened with such details.

The inventor of the present invention is cognizant that physical repositioning of the sensing elements over the sensor die presently is not a realistic solution to shifts that may result in unacceptable sensing performance of the sensor. The inventor of the present invention, however, has innovatively recognized a processing technique that in one aspect allows virtual repositioning of any of the sensing elements in the sensor die after or during sensor assembly. This allows the output signal of the sensor to accurately and consistently indicate a tooth edge location, free of any errors that may otherwise occur due to shifts of the sensing elements or due to the physical characteristics of the object being sensed relative to the sensing elements, or both. In another aspect, the inventor of the present invention has further recognized processing techniques for reconfiguring a sensor that allow adjusting at least one operational parameter of one or more of the sensing elements of the sensing array to meet the applicable sensing requirements.

A processor 22, such as a microprocessor, is configured for selecting at least one of the sensing elements 12 to supply a sensing element output signal. In one exemplary embodiment, processor 22 is configured to adjust at least one operational parameter of any selected sensing element. By way of example, the operational parameter to be adjusted may comprise at least one threshold level for the selected sensing element, a scale factor, an offset value or any combination of the foregoing parameters.

Figure 2:
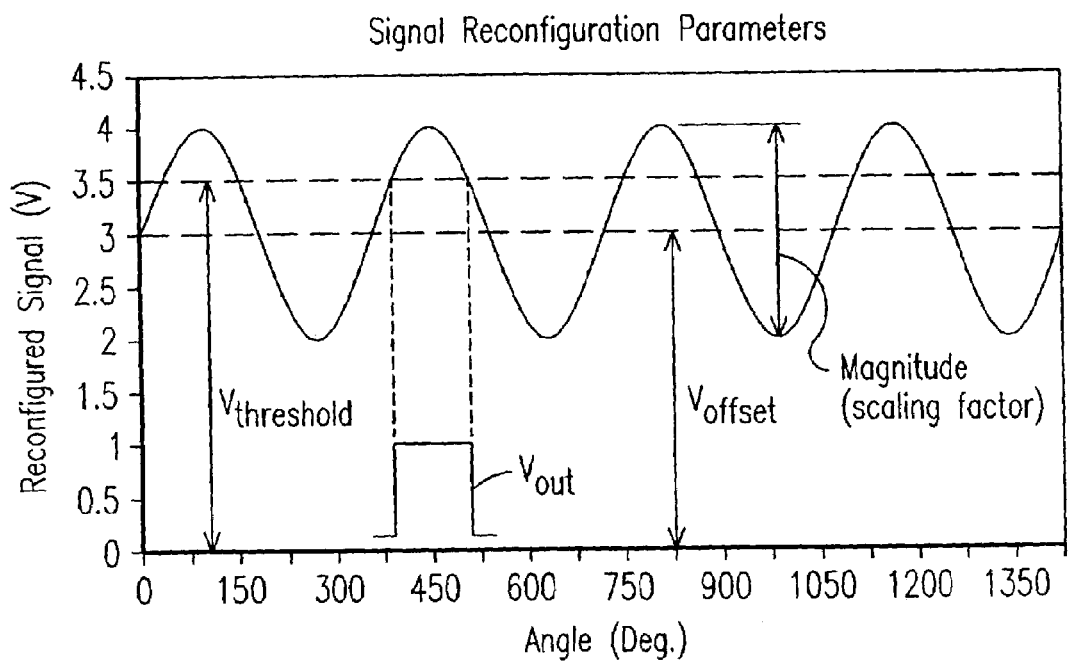
FIG. 2 is a plot of an exemplary signal from a sensing element as may be reconfigured in accordance with aspects of the present invention.

FIG. 2 is a plot of an exemplary signal from a sensing element as may be reconfigured in accordance with aspects of the present invention. Examples of parameters that may be adjusted to meet the sensing requirements have been annotated on the signal plot.

Figure 3:
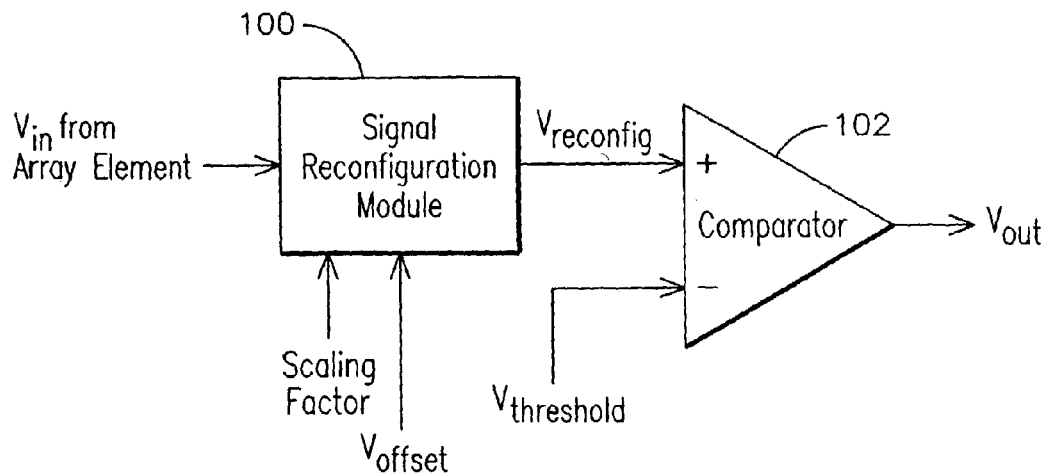
FIG. 3 illustrates an exemplary signal-configuring module responsive to adjustments performed on one or more operational parameters of respective sensing elements.

FIG. 3 illustrates an exemplary signal-configuring module 100, such as may be a part of processor 22, for performing adjustments to one or more operational parameters of respective sensing elements. By way of example, when the magnitude of the reconfigured signal from a sensing element crosses (either over or under) one or more threshold levels, such as an upper threshold or a lower threshold level, any such occurrences may be used to commence a specific action for determining the position of the sensed object. The action may include starting a timer or a counter so that one may determine whether the object is experiencing acceleration, or how much and how fast the object has moved over a measuring interval. In the enclosed example, when Vreconfigured exceeds Vthreshold, a comparator 102 may switch its logical state from a logic "zero" to a logic "one".

As shown in the signal plot of FIG. 2, adjusting the value of Vthreshold may allow adjusting the tooth edge location information conveyed by the comparator output signal Vout relative to the actual location of tooth edges of the sensed target. It will be understood that the signal-configuring module 100 shown in FIG. 3 is not limited to providing adjustments to the output signal of a single sensing element. In the general case, any combination of sensing elements from the sensing array may be selected so that their respective output signals may be processed to best achieve the applicable sensing requirements.

Returning to FIG. 1, processor 22 is further configured to select at least one sensing element to establish a spatial separation relative to another sensing element of the sensing array. The established spatial separation may be selected to match the physical characteristics of the object being sensed. For example, the spatial separation between the tooth edges of a given target wheel may require using the respective signals from sensing elements $12_1$ and $12_3$, whereas for a distinct target wheel one may desire to use the signals from sensing elements $12_1$ and $12_5$.

In one exemplary embodiment, a multiplexer 20 may be used for electrically coupling each signal from any selected sensing element/s to processor 22. Although the above example makes reference to a pair of sensing elements, it will be appreciated that the present invention is not limited to pairs of sensing elements since any desired group of sensing elements, even a group made up of a single sensing element, may be used to generate a signal indicative of the position of the object.

In the case of a differential sensor that combines the output from two sensing elements, the respective signals from these sensing elements would be phase shifted relative to one another by an angle corresponding to the spacing between the two sensing elements. One of the signals is subtracted from the other, such as may be performed with a differential amplifier or with a software-based subtraction operation that may be programmed in a combining module 24, such as may be a part of processor 22. The resultant difference may be compared with an appropriate threshold level to generate a digital signal indicative of the position of the target wheel. It will be appreciated that the threshold level comparison need not be performed on the resultant difference since individual comparisons could be made for each of the signals relative to a respective threshold level corresponding to each individual sensing element. It will be further appreciated that the present invention is not limited to differential sensors since the combination of the output signals from a group of sensing elements need not involve a subtraction operation. For example, in the case of combining the output signals from more than two sensing elements, a ratio or weighing computation may be used to obtain a combined output signal indicative of the position of the object.

Those skilled in the art will now appreciate the versatility of aspects of the sensor of the present invention since one not only has the flexibility of performing an individual calibration for each sensing element, but one has the ability of choosing which specific sensing element or combination of sensing elements is likely to meet the requirements of any given sensing application.

Figure 4:
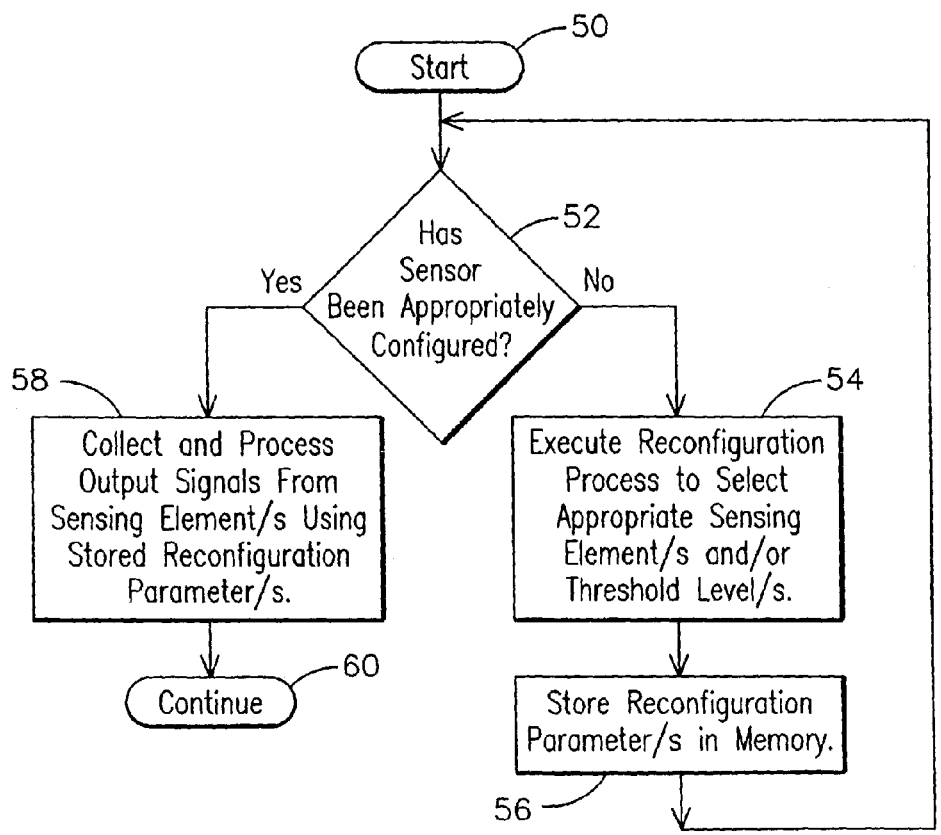
FIG. 4 is a flow chart illustrating steps of an exemplary method for selectively reconfiguring a sensor according to applicable requirements for sensing the position of an object.

FIG. 4 is a flow chart illustrating exemplary steps or actions of a method for selectively reconfiguring a sensor according to applicable requirements for sensing the position of an object. Subsequent to start step 50, the method allows determining at step 52 whether the sensor needs to be configured to meet the applicable sensing requirements. In the event the sensor needs to be reconfigured, step 54 allows executing a sensor reconfiguring process for selecting at least one of the sensing elements from a sensing array to supply a sensing element output signal. In one exemplary embodiment, the sensor reconfiguring process may comprise adjusting one or more operational parameters of the selected sensing element to meet the applicable sensing requirements. By way of example, the operational parameter to be adjusted may comprise at least one threshold level for the selected sensing element, a scale factor, an offset value or any combination of the foregoing parameters.

In another exemplary embodiment, the reconfiguring action may comprise selecting at least one sensing element to establish a spatial separation relative to at least another sensing element of the array. The spatial separation may be selected to match physical characteristics of the object being sensed. Step 56 allows storing the reconfiguration parameters in memory. By way of example, the reconfiguration parameter may comprise at least one threshold level for the selected sensing element, a scale factor, an offset value or any combination of the foregoing parameters. The reconfiguration parameter may further comprise a set of sensor combinations to be selectively used based, for example, on the geometrical characteristics of the object being sensed. For example, one sensor combination may be used for a target wheel having small edge tooth separation while another sensor combination may be used for a target wheel with a larger edge tooth separation.

In the event the sensor has been reconfigured, and prior to continuing step 60, step 58 allows collecting and processing the output signals from any selected sensing elements using the stored reconfiguration parameters. In one exemplary embodiment, one may combine the output signal from at least one sensing element with an output signal from another sensing element from the array to generate a combined signal indicative of the position of the object.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A method for selectively reconfiguring a sensor according to applicable requirements for sensing the position of an object, the method comprising:
   providing a sensor comprising an array of galvanomagnetic sensing elements spaced apart over a sensor die and adapted to provide output signals indicative of object position;
   determining whether the sensor has been configured to meet the applicable sensing requirements; and
   in the event the sensor needs to be reconfigured, executing a sensor reconfiguring process for selecting at least one of the sensing elements from the sensing array to supply a sensing element output signal, wherein the sensor reconfiguring process comprises:
   adjusting at least one operational parameter of said selected sensing element to meet the applicable sensing requirements.

2. The method of claim 1 wherein the at least one operational parameter to be adjusted is selected from the group consisting of at least one threshold level, a scale factor, an offset value, and any combination of the foregoing parameters for said at least one sensing element.

3. The method of claim 1 wherein the selecting action comprises selecting said at least one sensing element to establish a desired spatial separation relative to at least another sensing element of the sensing array, the spatial separation being selected to match physical characteristics of the object being sensed.

4. The method of claim 3 further comprising combining the output signal from the at least one sensing element with an output signal from said another sensing element to generate a combined signal indicative of the position of the object.

5. The method of claim 3 further comprising adjusting at least one operational parameter of said another sensing element, wherein the at least one operational parameter to be adjusted is selected from the group consisting of at least one threshold level, a scale factor, an offset value, and any combination of the foregoing parameters for said another sensing element.

6. A reconfigurable sensor, the sensor reconfiguration selected according to applicable requirements for sensing the position of an object, the sensor comprising:
   an array of galvanomagnetic sensing elements spaced apart over a sensor die; and
   a processor for selecting at least one of the sensing elements to supply a sensing element output signal, the processor configured to adjust at least one operational parameter of said at least one sensing element, wherein the at least one operational parameter to be adjusted is selected from the group consisting of at least one threshold level, a scale factor, an offset value, and any combination of the foregoing parameters for said at least one sensing element.

7. The sensor of claim 6 wherein the processor is further configured to select said at least one sensing element to establish a spatial separation relative to at least another sensing element of the array, the spatial separation being selected to match physical characteristics of the object being sensed.

8. The sensor of claim 7 further comprising means for combining the output signal from said at least one sensing element with an output signal from said at least another of the sensing elements to generate a combined signal indicative of the position of the object.

9. The sensor of claim 7 wherein the processor is further configured to adjust an operational parameter of said another sensing element, wherein the at least one operational parameter to be adjusted is selected from the group consisting of at least one threshold level, a scale factor, an offset value, and any combination of the foregoing parameters for said another sensing element.

10. A method for selectively reconfiguring a sensor according to applicable requirements for sensing angular position of a wheel having circumferentially spaced teeth, the method comprising:
   providing an array of sensing elements adapted to provide output signals indicative of movement of said teeth relative to the sensing element; and
   selecting at least one of the sensing elements from the array of sensing elements to supply a sensing element output signal, wherein the selecting of said at least one of the sensing elements comprises at least one of the following actions:
      a) adjusting at least one operational parameter of said at least one sensing element; and
      b) selecting said at least one sensing element to establish a spatial separation relative to another sensing element from the sensing array, the spatial separation being selected to match physical characteristics of the circumferentially spaced teeth.

11. The method of claim 10 further comprising adjusting at least one operational parameter of said another sensing element, wherein the at least one operational parameter to be adjusted is selected from the group consisting of at least one threshold level, a scale factor, an offset value, and any combination of the foregoing parameters for said another sensing element.

12. The method of claim 10 further comprising combining the output signal from the at least one sensing element with an output signal from said another of the sensing elements to generate a combined signal indicative of the position of the object.

13. A method for selectively reconfiguring a sensor according to applicable requirements for sensing angular position of an engine crankshaft comprising a wheel having circumferentially spaced teeth, the method comprising:
   providing an array of galvanomagnetic sensing elements coupled to a magnetic field and adapted to provide an electrical signal in response to the movement of the teeth relative to the sensing element; and
   selecting a first sensing element of the array of sensing elements to supply a sensing element output signal;
   selecting a second sensing element of the array of sensing elements so as to establish a spatial separation relative to said first sensing element to match physical characteristics of the object being sensed; and
   adjusting at least one operational parameter of at least one of said first and second sensing elements.

14. The method of claim 13 wherein the at least one operational parameter to be adjusted is selected from the group consisting of at least one threshold level, a scale factor, an offset value, and any combination of the foregoing parameters.

15. The method of claim 13 further comprising combining the output signal from the first sensing element with an output signal from said second sensing element to generate a combined signal indicative of the position of the object.

* * * * *